INVENTORS.
John R. Ward, Jr.
Kenneth C. Naslund
By Merriam, Smith & Marshall
ATTORNEYS.

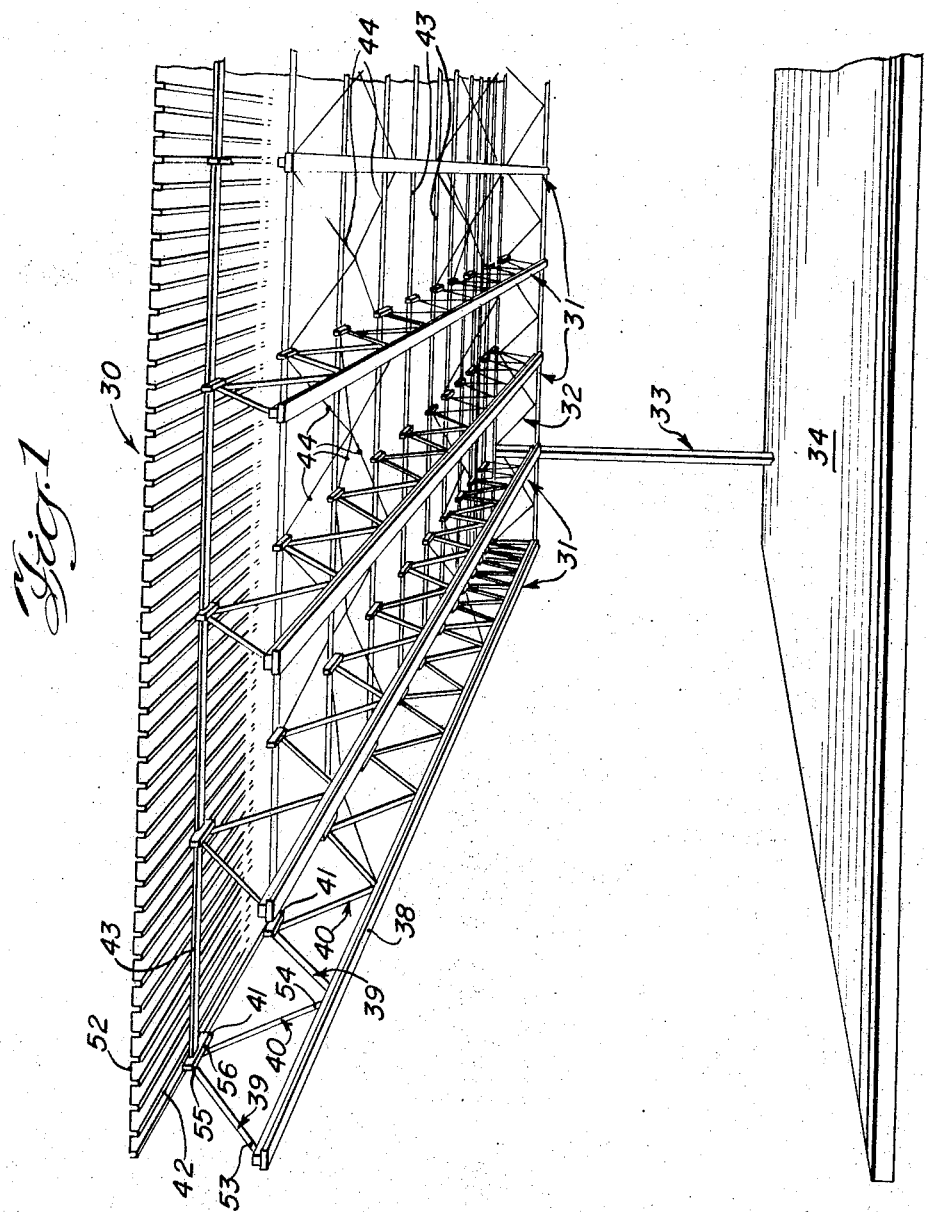

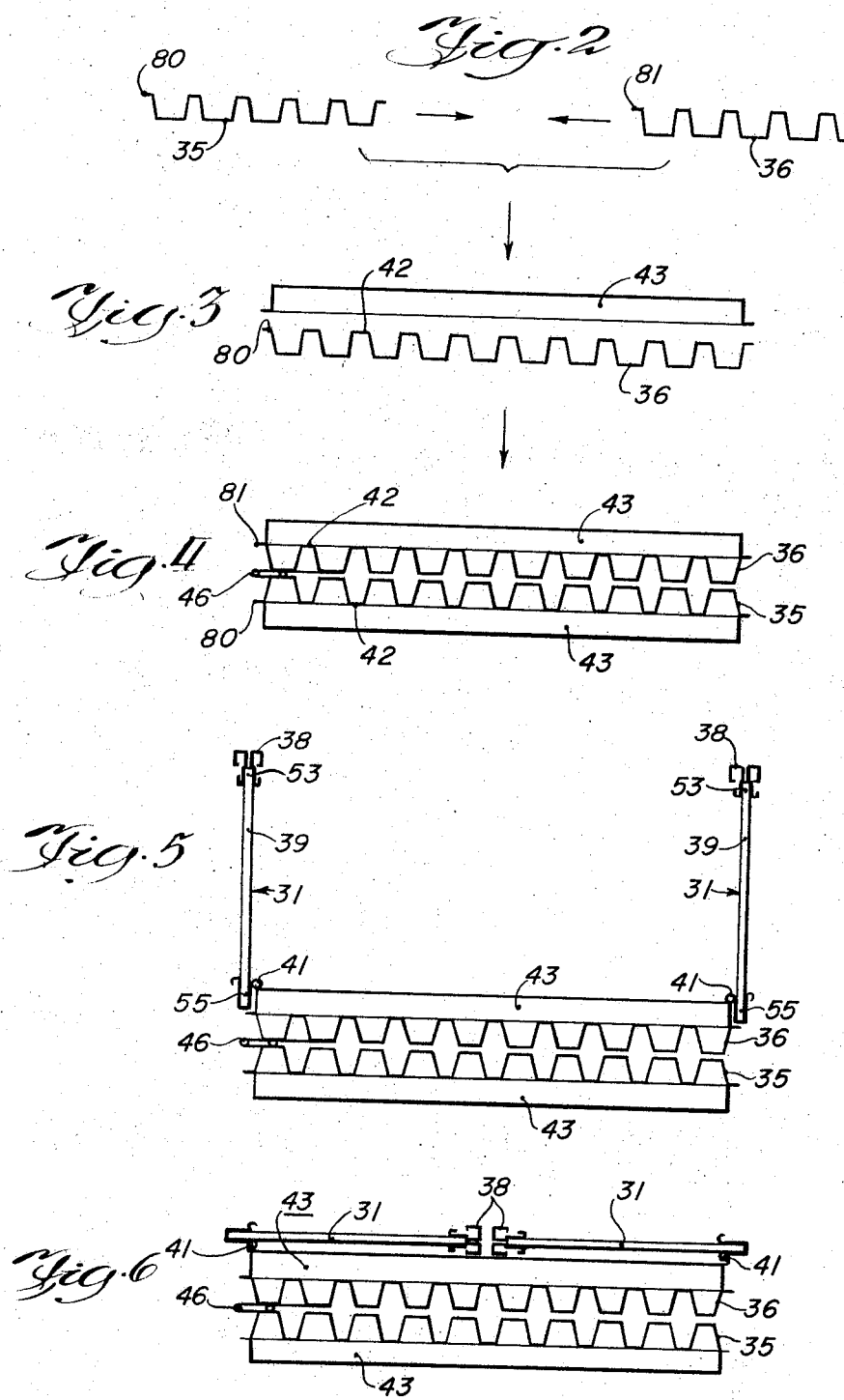

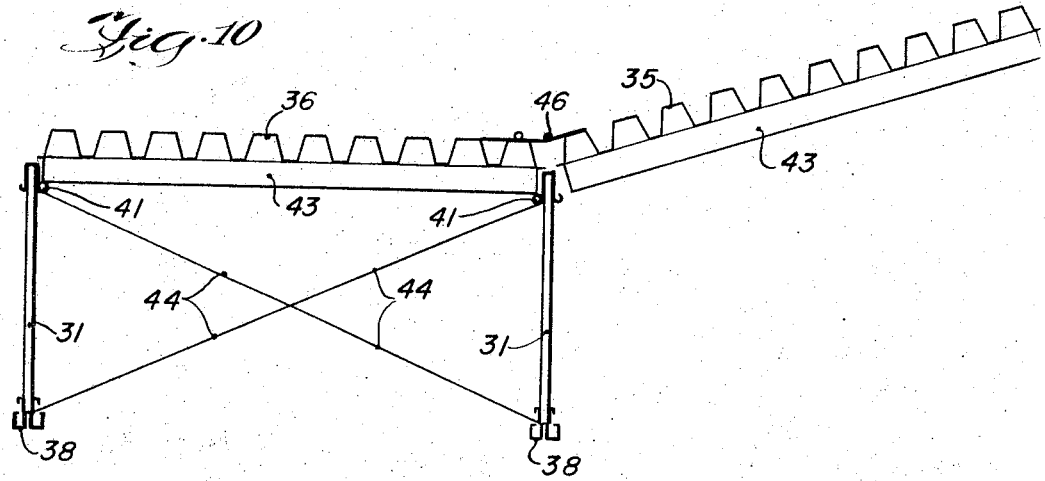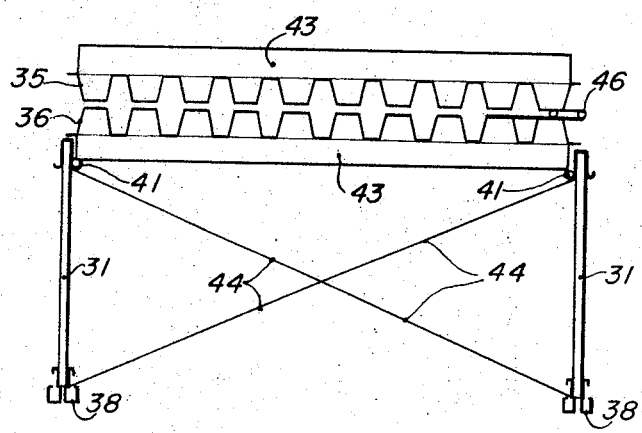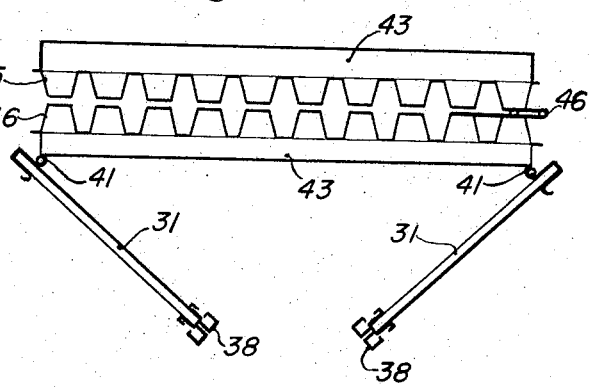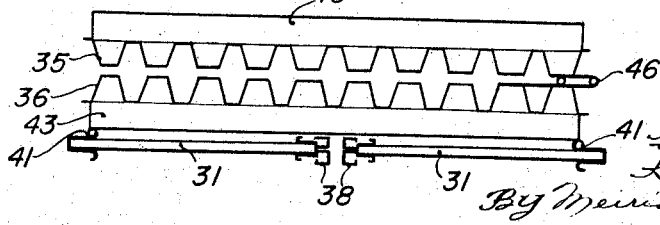

Aug. 22, 1967        J. R. WARD, JR., ET AL        3,336,717
                         DECK AND TRUSS
Filed June 29, 1964                                8 Sheets-Sheet 5

INVENTORS.
John R. Ward, Jr.
Kenneth C. Naslund
By Merriam, Smith & Marshall
ATTORNEYS.

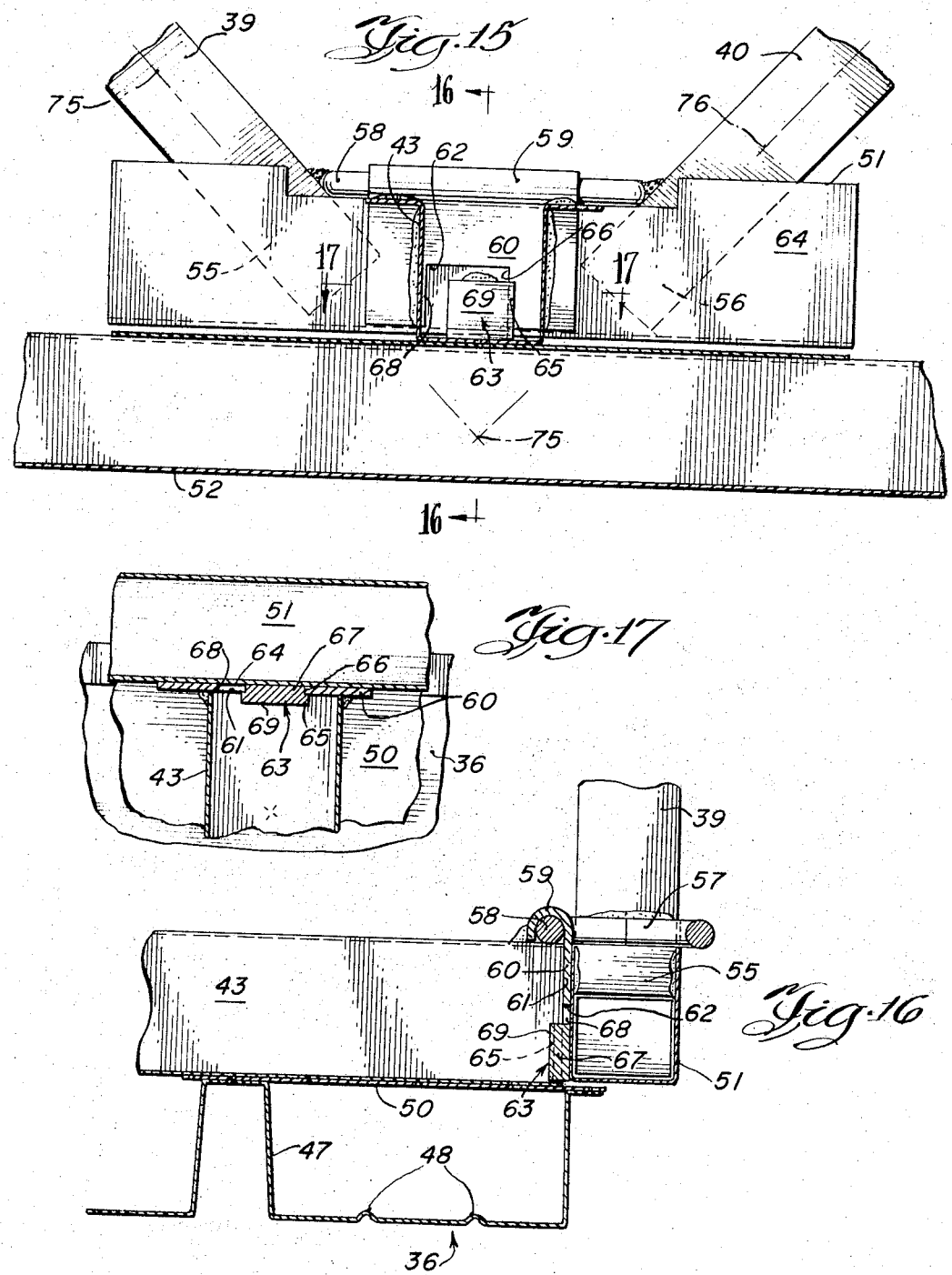

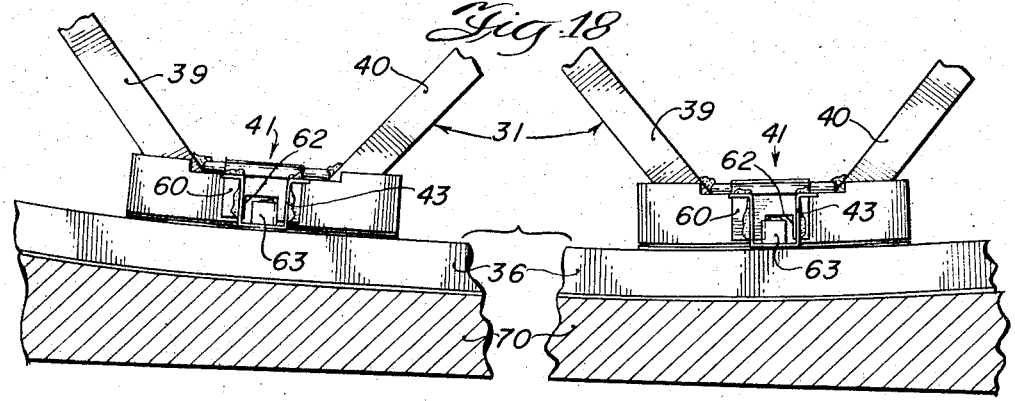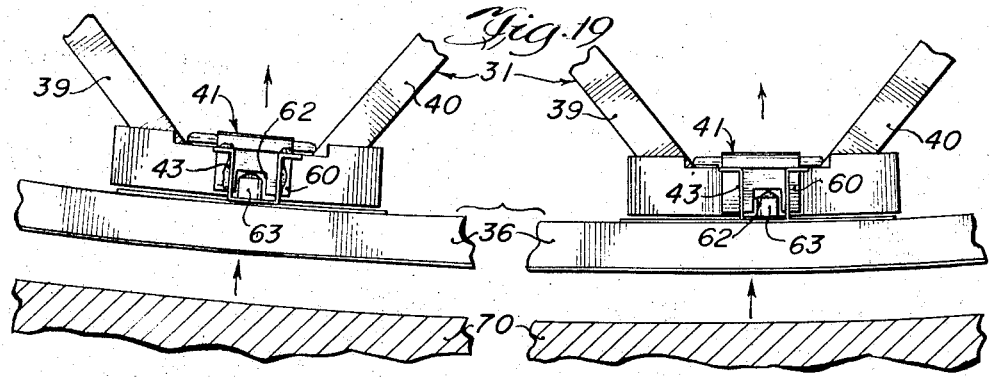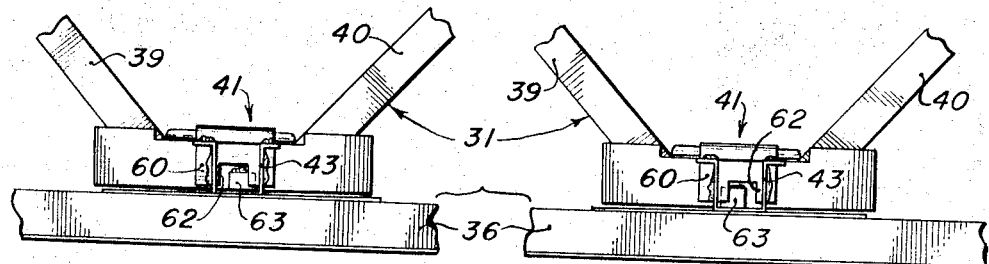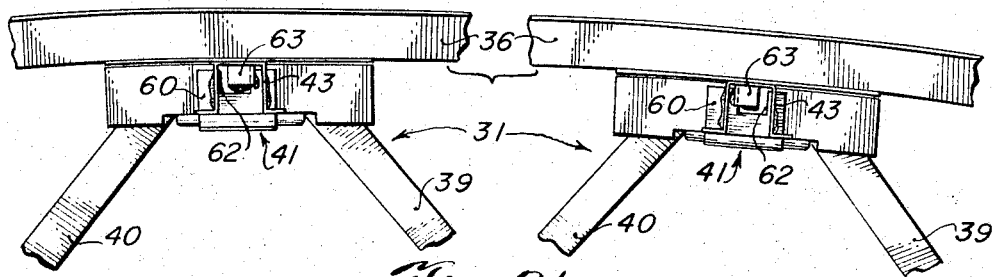

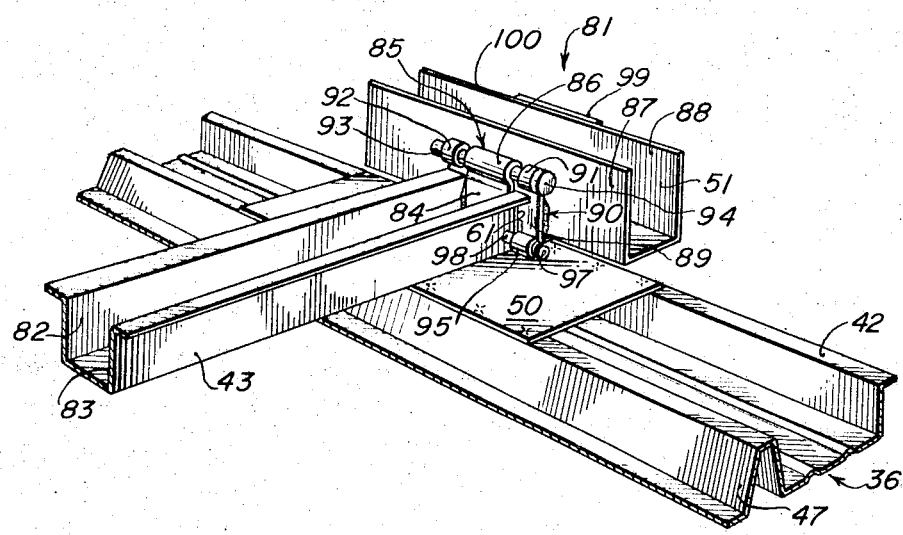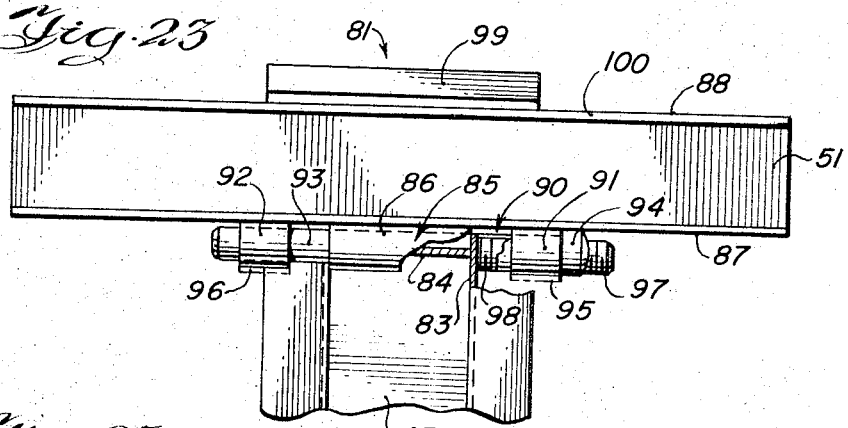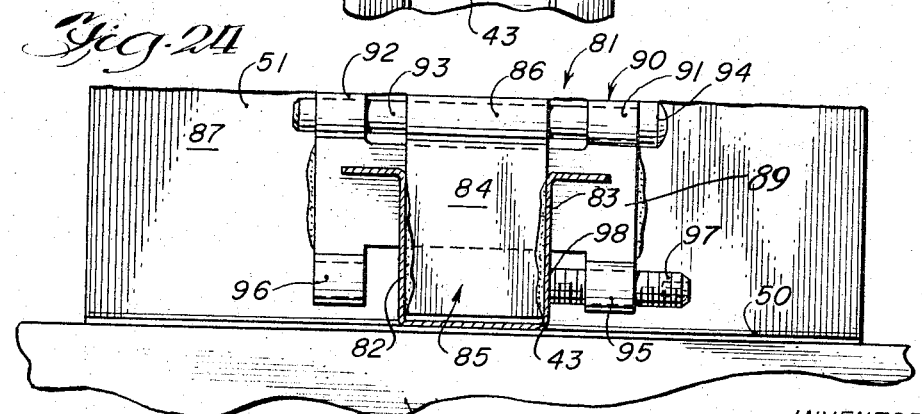

United States Patent Office 3,336,717
Patented Aug. 22, 1967

3,336,717
DECK AND TRUSS
John R. Ward, Jr., and Kenneth C. Naslund, Chicago, Ill., assignors to Inland Steel Products Company, Milwaukee, Wis., a corporation of Delaware
Filed June 29, 1964, Ser. No. 378,884
12 Claims. (Cl. 52—645)

The present invention relates generally to prefabricated deck or roof constructions for buildings, and more particularly to a prefabrication consisting essentially of an elongated deck or roof portion having a supporting truss hingedly connected thereto to permit the truss to be folded against the deck portion to facilitate storage, transportation and erection of the prefabricated deck and truss.

A further feature of the present invention resides in an embodiment wherein the roof is provided with a camber in the longitudinal direction of the roof and foldable truss, and the foldable truss is hingedly mounted utilizing adjustable means which accommodates for the camber in the roof during folding and unfolding of the truss relative to the roof.

Another feature of the present invention resides in the inclusion of means which enables the deck portion and truss to be preassembled with the deck portion in a predetermined cambered condition, enables the deck portion with foldable truss to be shipped with the truss folded and the deck portion in a condition other than the aforementioned cambered condition, and enables the cambered condition to be readily reinstated upon erection of the deck portion and truss at the building site.

Other features and advantages are inherent in the structure claimed and disclosed or will become apparent to those skilled in the art from the following detailed description in conjunction with the accompanying diagrammatic drawings wherein:

FIGURE 1 is a perspective view of a building interior illustrating an embodiment of a deck and truss constructed in accordance with the present invention, with the deck and truss in an erected condition;

FIGURES 2 through 10 are diagrammatic drawings illustrating an embodiment of the deck and truss in various stages of assembly, storage or transportation, and erection;

FIGURE 15 is a sectional view taken along line 15—15 in FIGURE 14;

FIGURE 16 is a sectional view taken along line 16—16 in FIGURE 15;

FIGURE 17 is a sectional view taken along line 17—17 in FIGURE 15;

FIGURES 18 through 21 illustrate various conditions of camber in the deck and truss during fabrication, preparatory to folding, during storage or transportation, and in an erected condition;

FIGURE 22 is a fragmentary perspective view showing another embodiment of a hinged connection of the truss to the deck;

FIGURE 23 is a plan view of the hinged connection of FIGURE 22; and

FIGURE 24 is a front view of the hinged connection of FIGURE 22.

Figure 11:
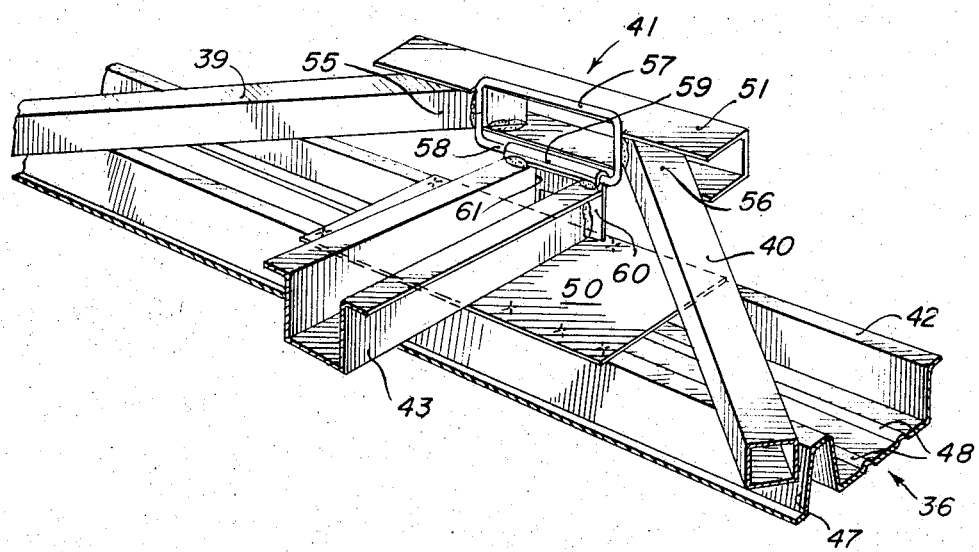
FIGURE 11 is a fragmentary perspective view showing an embodiment of a hinged connection of the truss to the deck with the truss in a folded position relative to the deck.

Referring initially to FIGURE 1, there is illustrated an embodiment of the present invention including a deck, indicated generally at 30, supported by a plurality of trusses, indicated generally at 31, with trusses 31 being supported by an end truss, indicated generally at 32, and by a plurality of posts 33 (only one of which is shown) extending upwardly from a floor slab 34. Deck 30 is composed of a plurality of alternating elongated deck means or portions 35, 36 (illustrated schematically in FIGURES 2–10).

Each truss 31 includes an elongated lower chord member 38, and a plurality of pairs of elongated web members 39, 40. Each web member 39, 40 has a respective one end 53, 54 attached to chord member 38 at respective longitudinally spaced locations on the latter; and web members 39, 40 converge toward each other from chord member 38. At the respective other ends 55, 56 of web members 39, 40, opposite those ends attached to chord member 38, the web members are tied together, and connected to the interior surface 42 of deck 30 by attaching means indicated at 41 in FIGURE 1. Attaching means 41 includes means, to be described in detail subsequently, mounting the web members and the chord member for pivotal movement, relative to the deck means, between a first position, in which the web members extend angularly from the deck means and the chord member is spaced vertically from the deck means, and a second position in which the vertical spacing between the chord member and the deck means is less than when the members are in the first position thereof.

Extending between attaching means 41 on adjacent trusses 31, along the interior surface 42 of roof 30, are cross members 43. Extending diagonally between adjacent trusses are cross braces 44.

After a truss 38 has been unfolded to the position shown in FIGURE 1, and has been attached to the end truss 32 or post 33, in the manner shown in FIGURE 1, the pivotal mounting of the truss relative to the deck is no longer needed, and truss 38 is rigidly secured to the interior surface of roof 30 by conventional means such as welding, bolting or the like.

A schematic representation of the arrangement of the components of the deck and truss during prefabrication, storage or transportation, and initial erection, are illustrated in FIGURES 2 through 10.

During prefabrication of the deck and truss, there are initially provided a pair of elongated deck portions 35, 36 (shown widthwise in FIG. 2); and a cross member 43 (FIG. 3) is attached to each of the deck portions on that surface 42 which will be the interior surface of the deck when the deck and truss are erected in the arrangement shown in FIGURE 1.

In one embodiment, following attachment of cross members 43 to the deck portions, deck portion 36 is placed atop deck portion 35, and the two are hingedly connected at 46 by conventional hinging means, e.g., a number of conventional three-leaf, two-pin hinges or a number of relatively ductile pieces of metal strapping, each attached to the two deck portions 35, 36 at spaced intervals along the length of the two deck portions (FIG. 4). The axis of hinge means 46 extends in the direction of adjacent edges 80, 81 on deck portions 35, 36 respectively (FIG. 2) when the deck portions are in an uncambered condition.

Referring to FIGURE 5, a pair of prefabricated trusses, each comprising an elongated chord member 38, and web member 39, 40 (with only web members 39 being shown in FIGURE 5), are hingedly connected at opposite side edges of deck portion 36 using hinged connecting means illustrated schematically at 41. The two trusses 31 are then folded to the position shown in FIGURE 6 wherein the trusses lie against and extend lengthwise along the length of deck portion 36; and in this position, deck portions 35, 36 and trusses 31 are in a condition for storage or shipment.

As will be described in detail subsequently, in some embodiments deck portion 36 is prefabricated on a camber table or jig having a predetermined camber corresponding to the camber desired to be imparted to the deck in the erected condition. In such a situation, deck portion 35 need not be hingedly connected at 46 to deck portion 36 until after trusses 31 have been folded to the position shown in FIGURE 6 and deck portion 36 has been removed from the camber table and is in a flat condition.

When the deck and truss have been shipped to the building site and are ready for erection, the entire package (deck portions 35, 36 and trusses 31, 31) is inverted to the position shown in FIGURE 7, and the trusses 31 are unfolded (FIG. 8) to a vertically extending position (FIG. 9) in which the truss web and chord members are all located substantially in a vertical plane extending from the deck. Cross braces 44 are then assembled into position, as shown in FIGURE 9.

The next step is to unfold deck portion 35 by pivoting it about the hinge means 46 from a location atop deck portion 36 to a position wherein deck portion 35 extends continuously alongside and is substantially parallel to deck portion 36. FIGURE 10 shows deck portion 35 in a partially unfolded condition. When deck portion 35 is in a completely unfolded position, it is supported atop a pair of trusses 31, with one truss being that shown attached to the right side of deck portion 36 in FIGURE 10 and the other truss being attached to the left side of another deck portion 36 located to the right of the deck portion 35 of FIGURE 10, and not shown. Opposite ends of cross member 43 on deck portion 35 are welded or otherwise rigidly connected to two adjacent supporting trusses 31, as shown in FIGURE 1, each truss being from a different package. The trusses are welded or otherwise rigidly attached to deck portion 36 to prevent further movement about the pivotal axis of attaching means 41. Before said attachment, the connecting means is strong enough to support at least the two deck portions and truss as well as such "live load" elements as men, equipment, wind, etc., on the deck.

Figure 12:
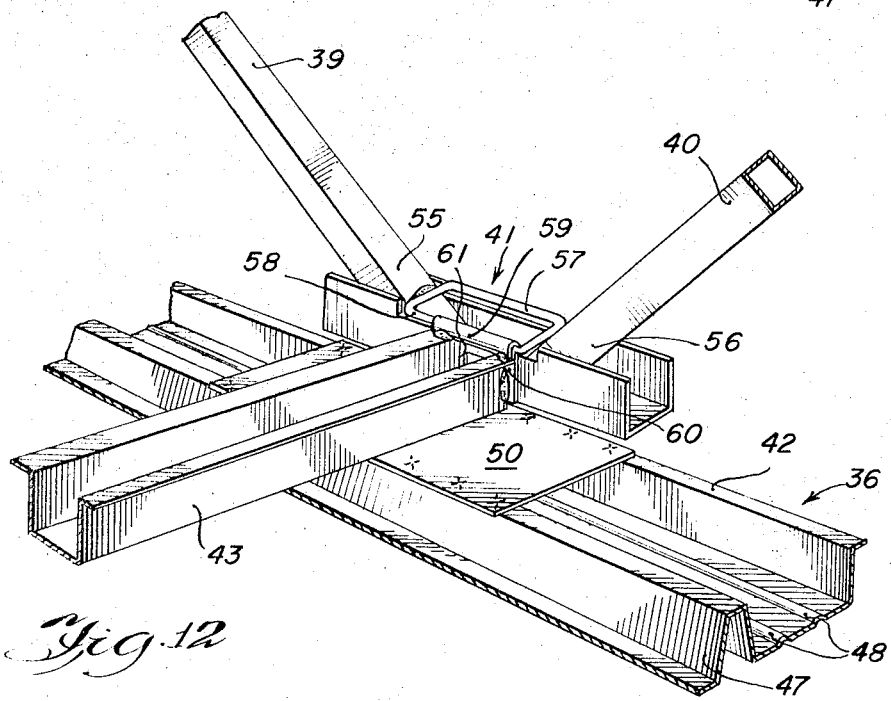
FIGURE 12 is a fragmentary perspective view similar to FIGURE 11 with the truss in an unfolded position relative to the deck.
Figure 13:
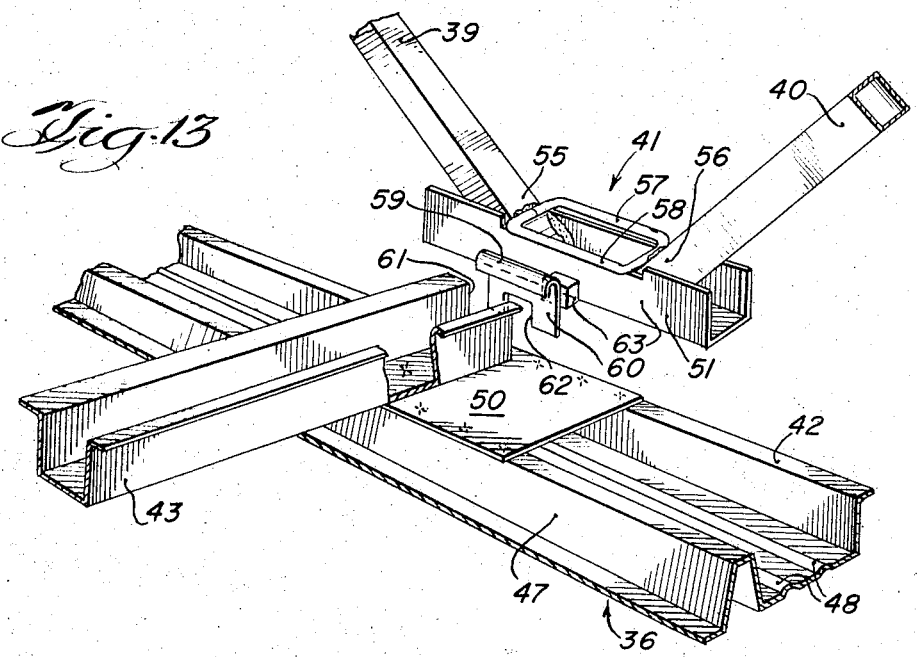
FIGURE 13 is an exploded fragmentary perspective view of the structure illustrated in FIGURES 11 and 12.
Figure 14:
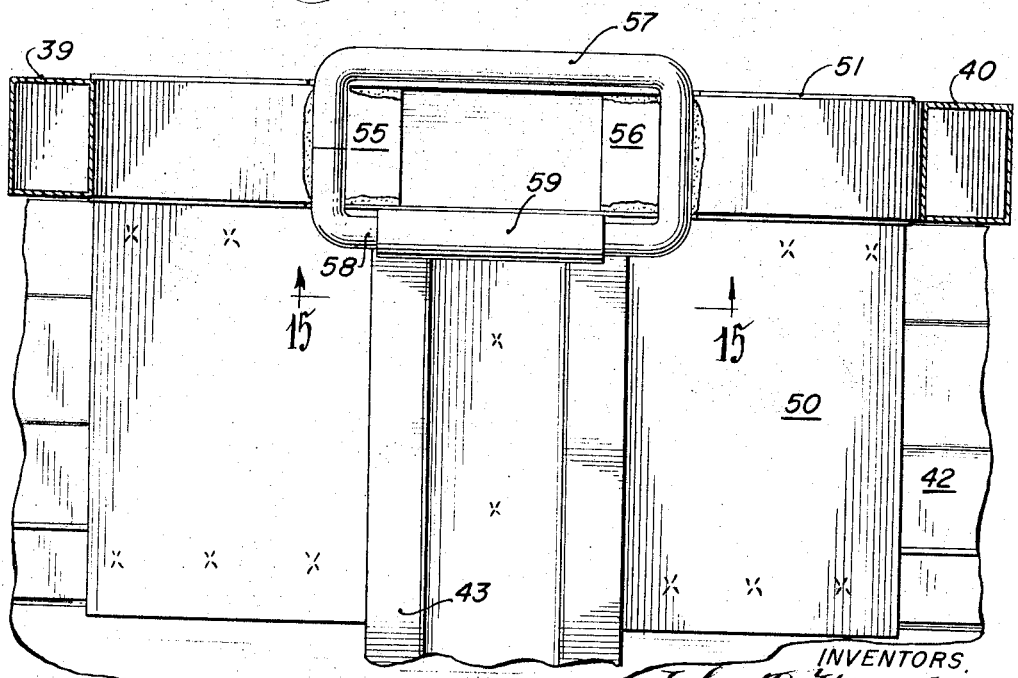
FIGURE 14 is an enlarged plan view illustrating a hinged connection of the truss to the deck.

The pivotal connection of truss 31 to deck portion 36 is illustrated in greater detail in FIGURES 11 through 17. In the illustrated embodiment, deck portion 36 is corrugated and includes longitudinally extending deformed parts 47, and longitudinally extending strengthening ribs 48. At the location of each pivotal connection 41, deck portion 36 has welded to its interior surface 42, a plate 50 to which is welded cross member 43 having a channel-shaped configuration in the illustrated embodiment.

Web members 39, 40 each have a respective one end 53, 54 attached to chord member 38, at respective longitudinally spaced locations along the chord member (FIG. 1); and each web member 39, 40 has a respective other end 55, 56 each extending into and welded to a relatively short channel-shaped tie member 51, constituting a part of hinged connecting means 41. The center lines 75, 76 of web members 39, 40 intersect at a point 75 located inwardly of the plane of the exterior surface 52 of deck portion 35 (FIG. 15).

Attached to tie member 51, between web members 39, 40, is a rectangular rod-like member 57 having a pivotal axis portion 58 defining the axis of rotation for truss 31 when the latter is moved between its folded and unfolded positions. Axis portion 58 is pivotally mounted on a bearing portion 59 of a plate 60 attached to that end 61 of cross member 43 which terminates at connecting means 41. Mounting or bearing portion 59 accommodates sliding axial movement of rod-like axis portion 58, along said pivotal axis, as well as providing for sliding back and forth movement of web member ends 55, 56 along a path parallel to axis portion 58. Plate 60 is vertical when deck means 36 is in an erected condition.

Connecting means 41 also include means, now to be described, for aligning the connecting means relative to the deck portion and for limiting movement of the connecting means toward the center of the truss (as measured along the length of the truss) when the deck and truss are erected and a load is applied thereto.

Referring especially to FIGURE 15, plate 60 includes a cut-out portion or opening 62 having a pair of opposite side edges 66, 68 which are vertical when the plate is vertical; and, attached to that surface 64 of tie member 51 facing the adjacent end 61 of cross member 43, is a plug 63. Plug 63 includes a body portion 67 and may include an end portion having a peripheral extension 65 extending in the direction of the center of the truss, as measured along the length of the truss; and when the truss in its its final assembled position relative to the deck, peripheral extension 65 overlaps that side edge 66 of opening 62 closest to the center of the truss, as measured along the length of the truss, and edge 66 engages plug body portion 67.

During prefabrication of a deck and truss, plate 60 is not assembled with the rest of the components of the deck and truss until after web members 39, 40 and attaching means 41 have been located in a predetermined position, relative to deck portion 36 and cross member 43, corresponding to the position which it is desired they assume when the deck and truss are in the erected, loaded condition of FIGURE 1. When this predetermined position has been achieved for the web members and the attaching means, plug 63 and the peripheral extension 65 on plug 63 are concurrently located in what is to be their finalized positions. Then hinge plate 60 is located, relative to plug 63, so that the peripheral extension 65 on plug 63 overlaps plate opening edge 66 and edge 66 engages the body portion 67 of plug 63 in the manner illustrated in FIGURES 15 and 17. After hinge plate 60 is thus located, it is welded to cross member 43.

Opening 62 has a cross-section large enough relative to the cross-section of plug 63 to accommodate sliding back and forth movement of plug 63 in the opening toward and away from side edge 66. Plug 63 is linked to rod portion 68 by tie member 51 and slides with rod portion 68. When it is desired to pivot the truss to a folded position atop deck portion 36, rod portion 58 is moved slidably in bearing portion 59 slightly to the left, as viewed in FIGURE 15, together with plug 63 until peripheral extension 65 on plug 63 no longer overlaps edge 66 on opening 62 and there is a clearance between plug peripheral extension 65 and plate opening edge 66. This condition is shown in FIGURE 19. The entire truss 38 can then be pivoted to the folded condition of FIGURE 6.

When the deck and truss are being erected, and the truss is unfolded to a vertically extending position relative to deck portion 36, rod portion 58 is moved slidably in bearing portion 59 slightly to the right, as viewed in FIGURE 15, together with plug 63 until the peripheral portion 65 of plug 63 again overlaps edge 66, and the body portion 67 of plug portion 63 engages edge portion 66. The arrangement just described assures that the location of truss web members 39, 40, relative to deck portion 36, will be the same in the erected condition as when the components were assembled during prefabrication.

The slidable mounting of pivotal axis 58 also provides an arrangement for facilitating pivotal movement of the truss relative to the deck portion when the deck portion is intended to be assembled and erected with a camber along the length thereof, as will be explained subsequently in detail. For purposes of deflection accommodation and drainage, it is desirable to provide the deck portion with a longitudinal camber or curvature when the deck portion is to be the roof on a building. To this end, all of the deck portions, 35, 36, are constructed of metallic material having sufficient flexibility to enable the deck portions to be initially prefabricated with a predetermined camber on a camber table or jig, and to permit the deck portion to be flexed to a flat or different cambered condition during folding of the trusses and for transportation.

FIGURES 18–21 depict a pair of hinged connections 41 for the deck and truss with each connection 41 being on a respective opposite side of the truss center, as measured along the length of the truss.

In FIGURE 18 a camber table 70 supports deck portion 36 thereon with the deck portion having a camber conforming to the predetermined camber of table 70. Two pairs of truss web members 39, 40 are pivotally attached to deck portion 36 by connecting means 41 at longitudinally spaced locations on deck portion 36. The position of FIGURE 18 is the position in which plates 60 are attached to cross members 43.

In FIGURE 19, the deck and truss, consisting of deck portion 36, truss web members 39, 40 and connecting means 41 have all been raised above camber table 70, e.g., by attaching cables to each of four opposite corners of deck portion 36 and lifting upwardly. This causes a slightly greater curvature or camber in deck portion 36 and a slightly greater curvature in the truss than was the case when it rested on table 70. In such a situation, the two deck-mounted plates 60 on the two pivotal connections 41 will be urged closer together than they were in the cambered condition of FIGURE 18, but the axis portions 58 and the rest of the truss-mounted connecting means 41 will not be so urged to the extent that the plates 60 are urged. As a result, hinge plates 60 are caused to move slidably relative to axis portions 58, toward the center of the truss, as measured along the length of the truss. Consequently, the peripheral extension 65 on plug 63 no longer overlaps the edge 66 of the opening 62 in plate 60; and truss web members 39, 40 may be pivoted slightly about pivotal axis 58, in a counterclockwise sense as viewed in FIGURE 16, until no portion of plug 63 extends through opening 62 in plate 60. If desired, the entire truss can then be pivoted to the folded position of FIGURE 6.

On the other hand, when the plug 63 has been pivoted to a location just outside opening 62, the deck portion 36 can be flexed to an uncambered condition and lowered to rest on the flat surface of a storage area or the bed of a transportation vehicle, in which situation the deck and truss components would assume the positions shown in FIGURE 20, wherein the plates 60 have moved slidably, relative to the pivotal axes 58, in respective directions away from the center of the truss, and opening edge 66 overlaps the front surface 69 of plug 63.

With the components of the deck and truss in the positions illustrated in FIGURE 20, the truss may be pivoted about its pivotal axis to the folded position shown in FIGURE 6.

When the deck and truss are to be erected, they are turned to an inverted position relative to the position of FIGURE 20, and the truss is unfolded relative to deck portion 36 with the deck portion maintained in the overcambered condition of FIGURE 19 (e.g., with a conventional three-point bridle suspension from a crane boom). Then, with plug 63 extending through opening 62, the overcamber is released by resting the truss on its supporting columns and releasing the overhead suspension, thereby causing axis 58 to move slidably in its mounting 59 until the peripheral extension 65 on plug 63 overlaps edge 66 on opening 62 of plate 60, and edge 66 engages body portion 67 of plug 63. When this has been acomplished, flexible desk portion 36 will be flexed in the same predetermined camber as existed when the deck portion rested atop camber table 70, as shown in FIGURE 18.

By providing deck portion 36 with sufficient flexibility to permit flexing thereof among the various conditions of camber and flatness illustrated in FIGURES 18 through 21, and by mounting pivotal axis 58 for slidable movement relative to deck portion 36, in the manner illustrated in the figures, not only may the truss be folded and unfolded relative to the deck, but also various conditions of camber in the deck can be accommodated without interfering with the folding and unfolding of the truss relative to the deck.

Referring now to FIGURES 22–24, there is illustrated another embodiment 81 of hinge means for connecting the truss (not shown) to deck means 36. As in embodiment 41 of FIGURES 11 and 12, embodiment 81 of FIGURES 22–24 includes a channel member 51 which receives and engages the ends of truss web members (not shown). As in embodiment 41, embodiment 81 includes a plate 50, attached to the interior surface 42 of the deck means 36; and a cross member 43 has an end 61 terminating at connecting means 81, with cross member 43 being attached to plate 50.

Cross member 43 has a pair of opposite sides 82, 83 between which is attached, as by welding, a plate portion 84 of an element 85 including a bearing portion 86 for slidably and rotatably receiving rod-like means or pivot pin 93.

Channel member 51 includes a pair of opposite sides 87, 88; and to that side 87 closer to end 61 of cross member 43 is attached, as by welding, a plate portion 89 of an element 90 having a pair of axially spaced bearing portions 91, 92 each for slidably and rotatably receiving pivot pin 93. Attached to side 88 at its terminal edge 100 is an L-shaped bracket 99.

During shop assembly of the deck and truss on the camber table, channel member 51 is located in the desired position relative to cross member 43, and element 90 is attached to side 87 of the channel member. Bearing portions 91, 92 of element 90 are arranged on opposite sides of bearing portion 86 on element 85, and portions 91, 86, 92 are axially aligned. Pivot pin 93 is then slidably inserted through the bearing portions; and this connects the truss to the deck and mounts the truss for pivotal movement, relative to the deck, about the axis of pivot pin 93.

Pivot pin 93 includes a head 94 which engages the adjacent bearing portion 91 of element 90. As viewed in FIGURES 23 and 24, the center of the truss, as measured along the length of the truss, is to the left of connecting means 81; and head 94 is located adjacent that bearing portion of element 90 more remote from the center of the truss.

That part of element 90 opposite bearing portion 91, 92 includes a pair of axially spaced threaded tubular portions 95, 96 each located alongside a respective opposite side 82, 83 of cross member 43. The threaded tubular portion farthest removed from the center of the truss (in this case, threaded portion 95) receives a threaded element 97 which is screwed through threaded portion 95 until an end 98 of the threaded element abuts the adjacent side 83 of cross member 43. Plate portion 84 of element 85 provides a backing for side 83.

The abutment of end 98 with side 83 fixes the relative positions of the various components of connection 81 in the final field-assembled structure.

When the deck and truss are lifted from the camber table and the camber is removed from the deck (preparatory to folding the truss on the deck for shipment to the final assembly site), channel member 51 and the components connected thereto, including element 90, pin 93 and threaded element 97, are moved slidably to the right (as viewed in FIGURES 23–24) relative to cross member 43 and element 85, with pin 93 sliding along its axis through bearing portion 86. The truss may then be folded relative to the deck, as previously described, by pivoting the truss about the axis of pin 93.

During erection in the field, after the truss is unfolded from the deck, the desired relative positions of all the components at connection 81 are achieved merely by sliding channel member 51 and connected components to the left (as viewed in FIGURES 23-24) relative to cross member 43 and element 85, with pin 93 sliding through bearing portion 86, until threaded element end 98 abuts cross member side 83. When all the components at all the hinged connections have been slidably moved to the desired positions, the desired camber is in the deck.

The foregoing detailed description has been given for clearness of understanding only, and no unnecessary limitations should be understood therefrom, as modifications will be obvious to those skilled in the art.

What is claimed is:
1. In combiantion:
   deck means having interior and exterior surfaces;
   an elongated truss chord member;
   a pair of elongated truss web members;
   means attaching one end of each web member to said chord member at respective longitudinally spaced locations on the latter;
   said web members converging toward each other from said chord meber;
   said deck means being elongated in the same direction as said chord member and having sufficient flexibility to flex between different conditions of longitudinal deck camber;
   and means, at the other ends of said web members, tying said other ends together and connecting said web members to the interior surface of said deck means;
   said connecting means including means mounting said web members and said chord member for pivotal movement, relative to said deck means, about a pivotal axis extending in the lengthwise direction of said chord member;
   said connecting means including means mounting said other ends of the web members for back and forth movement along a path extending parallel to said pivotal axis to accommodate said different conditions of longitudinal deck camber.

2. In the combination of claim 1 wherein said connecting means includes:
   means mounting said web members and said chord member for pivotal movement, relative to said deck means, between a first position, in which all of said members are located substantially in a vertical plane extending from said deck means, and a second position in which all of said members lie alongside the interior surface of said deck means.

3. In the combination of claim 1 wherein said connecting means includes:
   rod-like means, secured to said other ends of said web members, and defining a pivotal axis extending in the longitudinal direction of said chord member;
   and means, secured to the interior surface of said deck means, mounting said rod-like means for rotation about its axis.

4. In the combination of claim 3 wherein:
   said last-recited means includes means mounting said rod-like means for sliding movement along its axis.

5. In the combination of claim 1 wherein said connecting means includes:
   rod-like means, secured to said other ends of said web members, and defining a pivotal axis extending in the longitudinal direction of said chord member;
   means, secured to the interior surface of said deck means, mounting said rod-like means for rotation about its axis and for sliding movement along its axis;
   plate means extending vertically from the deck means when the latter is in an erected condition;
   an opening in said plate means, said opening including a side edge which is vertically disposed when the plate means is vertical;
   plug means secured to the other ends of said web members;
   said plug means having a body portion and an end portion extending through said opening when the web members are in said first position thereof;
   said side edge including means for engaging said body portion of the plug means;
   said opening having a cross-section large enough relative to the cross-section of the plug means to accommodate back and forth sliding movement of the plug means in the opening toward and away from said side edge;
   said connecting means including means linking said plug means to said slidable axis for sliding movement of the plug means wtih the slidable axis.

6. In the combination of claim 1 wherein said connecting means includes:
   a pin;
   means connecting said pin to the other ends of said web members;
   means, connected to the interior surface of the deck means, mounting said pin for rotation about its axis and for sliding movement along its axis;
   a threaded element having an end;
   a threaded tubular portion connected to the other ends of said web members and threadedly engaging said threaded element;
   said end of said threaded element extending through said tubular portion;
   and means secured to the interior surface of said deck means for abuttingly engaging the end of the threaded element.

7. In combination:
   deck means;
   an elongated truss;
   said deck means being elongated in the same direction as said truss and having sufficient flexibility to flex between different conditions of longitudinal deck camber;
   and a plurality of means, each attached to said truss at respective longitudinally spaced locations along said truss, and each connecting a respective portion of the truss to said deck means, at respective spaced locations along said deck means, for pivotal movement of the truss, about an axis extending substantially in the longitudinal direction of said truss, between a first position in which the truss extends angularly from the deck means and a second position in which the truss lies alongside the deck means;
   each of said connecting means comprising means mounting its respective truss portion for movement relative to the deck means, in an axial direction along said pivotal axis to accommodate said different conditions of deck camber.

8. In the combination of claim 7 wherein:
   said deck means has an interior surface, an exterior surface, and a side edge;
   said connecting means are secured at spaced locations to the interior surface of said deck means along said side edge;
   and said truss lies against said interior surface when the truss is in its last-recited position.

9. A combination as recited in claim 8 and comprising:
   another deck means;
   and means hingedly connecting said other deck means to a portion of the first-recited deck means adjacent said edge thereof for pivotal movement of the other deck means, relative to the first-recited deck means, about axes extending in the direction of said edge, between one position in which the other deck means lies against said exterior surface of the first-recited deck means and another position in which the other deck means is disposed alongside the first-recited deck means;
   said truss including means for engaging and supporting said other deck means when the other deck means is in its other position and the truss is in its first position.

10. In combination:
 deck means;
 an elongated truss;
 said deck means being elongated in the same direction as said truss and having sufficient flexibility to flex between different conditions of longitudinal deck camber;
 means connecting a portion of said truss to said deck means and mounting said truss for pivotal movement, relative to said deck means, about a pivotal axis extending in the lengthwise direction of said truss between a first position in which the truss extends angularly relative to the deck means and a second position in which the truss extends angularly at a different angle than when the truss is in said first position thereof;
 said connecting means including means mounting the connected portion of the truss for adjustable movement, relative to the deck means, in an axial direction along said pivotal axis to accommodate said different conditions of longitudinal deck camber;
 and said connecting means including means for limiting movement of said connected portion in said axial direction toward the center of the truss, as measured along the length of the truss, past a predetermined position which said connected portion is to occupy when the truss and the deck means are in an erected, loaded condition.

11. In the combination of claim 10 wherein:
 said connecting means comprises means for supporting at least the load of said deck means and truss when the deck means and truss are in an erected, loaded condition.

12. In combination:
 an elongated deck member;
 an elongated truss including means for supporting said deck member with the deck member in a substantially horizontal disposition and the truss in a substantially vertical disposition;
 said deck member being elongated in the same direction as said truss and having sufficient flexibility to flex between different conditions of longitudinal deck camber;
 and means connecting a portion of said truss to said elongated deck member and mounting said truss for pivotal movement, relative to said elongated deck member, about a pivotal axis extending substantially horizontally in the lengthwise direction of said truss and said deck member;
 said connecting means including means mounting the connected portion of the truss for movement, relative to said elongated deck member, in an axial direction along said pivotal axis to accommodate said different conditions of deck camber.

References Cited

UNITED STATES PATENTS

| 687,364 | 11/1901 | Wixcel | 182—152 X |
| 2,642,825 | 6/1953 | McElhone et al. | 52—641 |
| 2,744,590 | 5/1956 | Butts | 52—645 |
| 2,985,264 | 5/1961 | Leonard | 52—645 X |
| 3,062,340 | 11/1962 | Hunnebeck | 52—641 X |

FOREIGN PATENTS

| 1,117,545 | 2/1956 | France. |
| 483,470 | 7/1953 | Italy. |

DAVID J. WILLIAMOWSKY, *Primary Examiner.*

HARRISON R. MOSELEY, KENNETH DOWNEY, *Examiners.*

A. I. BREIER, *Assistant Examiner.*